United States Patent Office 2,754,124
Patented July 10, 1956

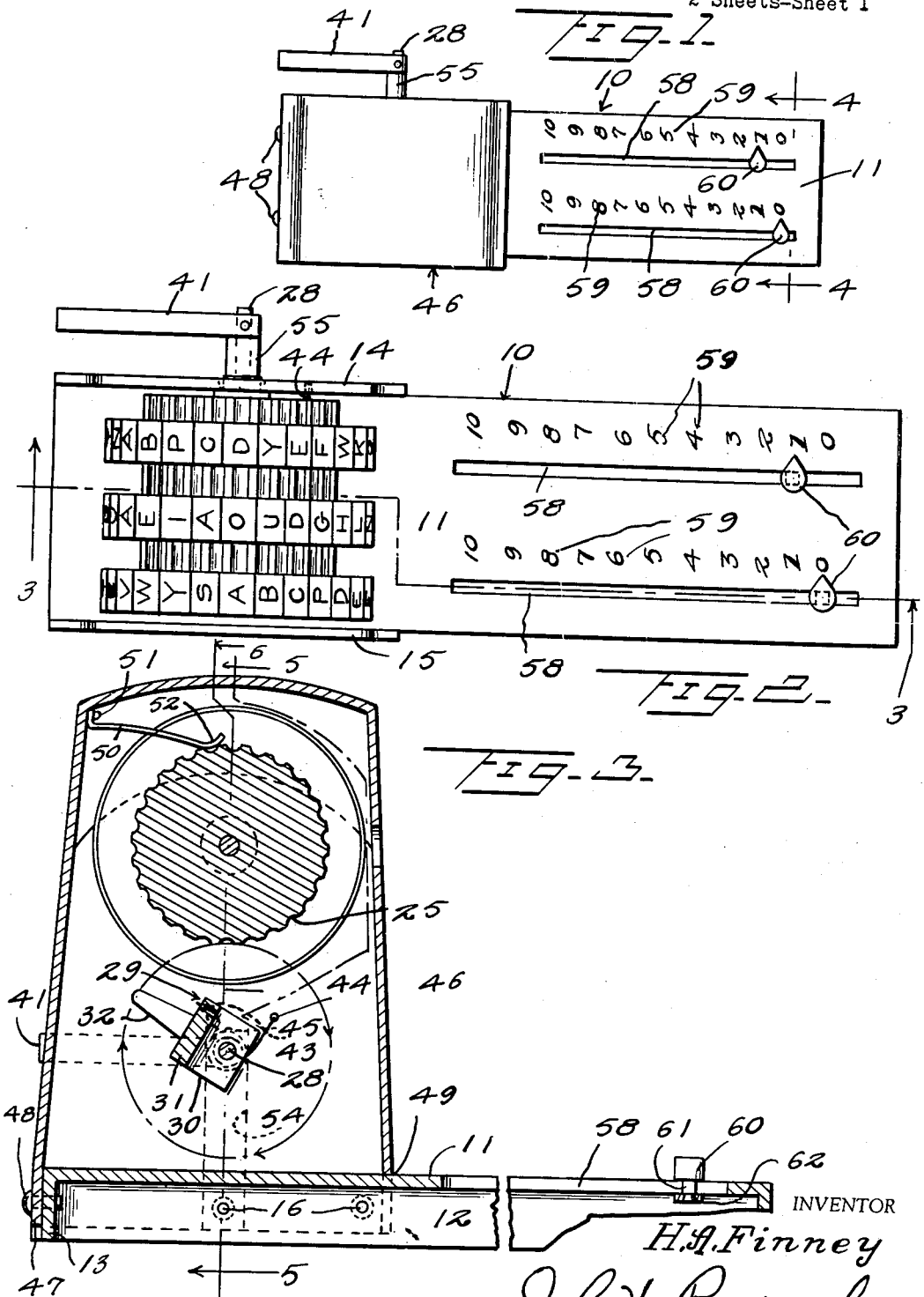

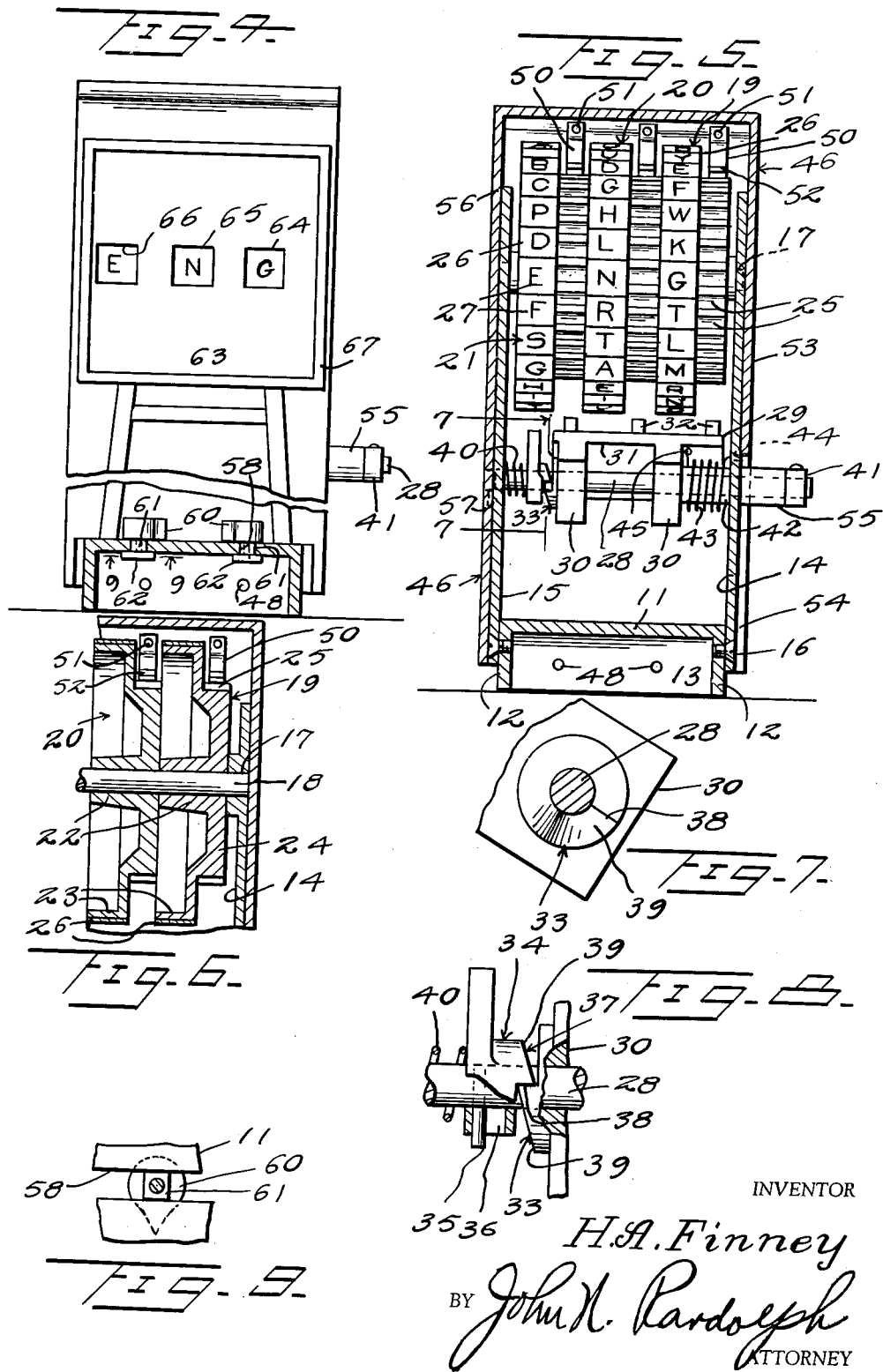

2,754,124

ROTATING DISK CHANCE DEVICE

Howard A. Finney, Hamilton, Mont., assignor to Skycraft Manufacturing Corporation, Long Beach, Calif., a corporation of California Application July 1, 1953, Serial No. 365,357

1 Claim. (Cl. 273—143)

This invention relates to a novel mechanical device constituting an educational toy primarily adapted for use by children in the teaching of reading and spelling and which is capable of being used by two or more children as an educational game.

More particularly, it is an aim of the present invention to provide a novel mechanical apparatus forming a game or toy whereby through manipulation of a manually actuated part a plurality of letter carrying elements may be simultaneously actuated for independent movement relatively to one another and to assume positions whereby a letter associated with each element will be disposed in an exposed position relatively to a window or opening so that the letters of the different elements which are exposed may or may not form a word.

Another object of the invention is to provide a novel means for imparting motion to the letter carrying elements functioning in conjunction with means for varying the speed and the duration of motion of said elements whereby the relationship of the letters of the different elements will be changed each time that the mechanism is operated.

Still a further object of the invention is to provide a game apparatus of simple construction yet which is extremely efficient in operation and durable and capable of being economically manufactured and sold.

Various other objects and advantages of the invention will hereinafter become more fully apparent from the following description of the drawings, illustrating a presently preferred embodiment thereof, and wherein:

Figure 1 is a top plan view of the toy;

Figure 2 is an enlarged top plan view thereof with the housing removed;

Figure 3 is a longitudinal vertical sectional view taken substantially along a plane as indicated by the line 3—3 of Figure 2, showing the housing in an applied position;

Figure 4 is an enlarged fragmentary cross sectional view, principally in front elevation, taken substantially along a plane as indicated by the line 4—4 of Figure 1;

Figure 5 is a cross sectional view taken substantially along a plane as indicated by the line 5—5 of Figure 3;

Figure 6 is a fragmentary vertical sectional view taken substantially along a plane as indicated by the line 6—6 of Figure 3;

Figure 7 is an enlarged fragmentary vertical sectional view taken substantially along a plane as indicated by the line 7—7 of Figure 5;

Figure 8 is an enlarged fragmentary elevational view, partly in section, of a portion of the structure as illustrated in Figure 5, and Figure 9 is a fragmentary sectional view, on an enlarged scale, taken substantially along a plane as indicated by the line 9—9 of Figure 4.

Referring more specifically to the drawings, the novel educational toy or game apparatus in its entirety and comprising the invention is designated generally 10 and includes an elongated plate 11 forming a base member having downturned side and end flanges 12 and 13, the bottom edges of which are adapted to rest on a supporting surface for supporting the plate 11 in an elevated position. A pair of bearing members 14 and 15 are secured to the side flanges 12 by fastenings 16 adjacent one end of the base or plate 11 and extend upwardly from said plate. Said bearing members 14 and 15 adjacent their upper ends are provided with aligned flanged bearing openings 17, as best illustrated in Figure 5, the flanges of which are located on the inner sides of said bearing members. A shaft 18 extends between the bearing members 14 and 15 and the ends of said shaft are disposed in said flanged openings 17. The shaft 18 may be turnably disposed in the openings 17 or may be nonrotatably supported by the bearing members 14 and 15. A plurality, preferably three, wheels 19, 20 and 21 are rotatably mounted on the shaft 18 between the bearing members 14 and 15, said wheels each including a relatively long centrally disposed hub 22 which turnably engages the shaft 18. Each of the wheels includes a peripheral portion 23 which is connected to the hub portion 22 by a wall 24. The wall 24 is formed integral with one end of the hub 22 with one side edge of the periphery 23 and is offset intermediate of its inner and outer ends to provide an annular outwardly facing flange 25 having a toothed peripheral surface. The toothed peripheral surface of the flange 25 is disposed around one end of the hub 22 and is spaced outwardly from an adjacent side edge of the periphery 23. The length of the hub 22 is equal to the combined width of the periphery 23 and the periphery of the flange 25. A strip 26 of heavy paper or the like is secured around each of the peripheries 23 and said strips or tapes 26 are provided with uniformly spaced letters of the alphabet, as indicated at 27 in Figures 2 and 5. The strips or tapes 26 are secured to the peripheries 23 so that the letters 27 thereof will be arranged in a predetermined relationship to the teeth of the flanges 25.

A shaft 28 is journalled in the bearing members 14 and 15 below the wheels 19, 20 and 21 and is slidably and turnably disposed in said bearing members. A wheel actuating unit, designated generally 29, includes a pair of spaced aligned bearing portions 30 which are journalled on an intermediate portion of the shaft 28 and which are integrally connected by an elongated bar 31 which extends parallel to and is spaced from the shaft 28. The wheel actuating unit 29 also includes three equally spaced drive fingers 32 which are fixed to and project from the outer side of the bar 31, the tips of which are so spaced relatively to the axis of the shaft 28 as to engage between the teeth of the flanges 25, as the drive fingers 32 pass between the shaft 28 and the flanges 25, for imparting rotation to the wheels 19, 20 and 21. Said drive fingers 22 are so spaced as to align with the flanges 25, as illustrated in Figure 5. The bearing member 30, which is located adjacent the bearing member 15, is provided on its outer side with a clutch half 33, which faces toward the bearing member 15. As best seen in Figure 8, a collar 34 is disposed on the shaft 28 between the clutch half 33 and the bearing member 15 and is nonrotatably connected to the shaft 28 by a pin 35 which is anchored in and projects outwardly from the shaft 28. The pin 35 engages an elongated slot 36 of the collar 34 which extends longitudinally of the shaft 28 to prevent said clutch collar 34 from rotating on the shaft 28 but to permit the collar to slide on the shaft toward and away from the clutch half 33. The collar 34 is provided with a clutch half 37 corresponding in construction to the clutch half 33 and facing toward said clutch half 33. The clutch halves 33 and 37 are provided with oppositely facing shoulders 38 which are disposed longitudinally of the shaft 28 and with inclined cam surfaces 39 which extend in opposite directions from the outer ends of the shoulders 38 and each of which is inclined inwardly of its clutch half from the shoulder 38 thereof, as clearly illustrated in Figure 8. An expansion coil spring 40 is disposed on the shaft 28 between the collar 34 and bearing member 15 for urging said collar toward the adjacent bearing member 30 to position the clutch half 37 in engagement with the clutch half 33. The end of the shaft located remote to the clutch halves extends outwardly a substantial distance from the bearing member 14 and has a lever arm or handle 41 fixed thereto and extending laterally therefrom.

A spacing sleeve 42 is disposed loosely on the shaft 28 between the bearing member 14 and the bearing member 30, located adjacent thereto. A spring 43 is wound around the spacing sleeve 42 and has one end anchored at 44 in the bearing member 14 and its opposite end anchored at 45 to the wheel actuator 29 for normally causing the unit 29 to revolve counterclockwise toward and beyond its position of Figure 3.

A housing 46 having an open bottom is disposed detachably over the bearing members 14 and 15 and over the parts, previously described, mounted therebetween. The housing 46 has a bottom portion 47 at one end thereof which is secured by fastenings 48 against the outer side of the end flange 13, which is located adjacent the bearing members 14 and 15. The other end of the housing 46 is provided with a notch 49 at the bottom thereof in which a portion of the plate 11 and side flanges 12 are snugly received for detachably supporting the housing on the base 11. Three leaf type springs 50 are anchored at corresponding ends thereof by fastenings 51 to the inner side of the upper portion of the housing 46. The springs 50 are provided with downwardly bowed free end portions 52 which are arranged to engage between the teeth of the wheel flanges 25, said springs 50 aligning with the wheel flanges, as best illustrated in Figure 5.

The side wall 53 of the housing 46 has a vertically extending slot 54 opening outwardly of the lower end thereof to accommodate the end of the shaft 28 which extends outwardly from the bearing member 14, when the housing 46 is applied. A spacing sleeve 55 is mounted on the shaft 28 between the lever arm 41 and housing wall 53. The other side wall 56 of the housing 46 is provided with an opening 57 to receive the adjacent end of the shaft 28 which aligns therewith when the housing 46 is secured to the aforementioned end flange 13.

The other end portion of the base or plate 11 is provided with two elongated longitudinally extending slots 58. A row of numerals 59 is disposed adjacent each slot 58 and longitudinally thereof. A pair of pointer elements 60 are slidably disposed on the upper side of the plate 11 above the slots 58 and have pointed ends pointing toward the rows of numerals 59 located adjacent said pointers. Each pointer 60 has a depending noncircular shank 61 which slidably and non-turnably fits the slot 58 over which each pointer 60 is disposed to prevent the pointer from turning on the plate 11. A retaining member 62 is secured to the lower end of each shank 61. The retaining members 62 frictionally engage the underside of the plate 11 and maintain the pointers 60 in frictional engagement with the upper side of the plate 11 so that said pointers may be forcibly moved longitudinally of the plate into transverse alignment with different ones of the numerals of the rows of numerals 59 and will be frictionally maintained in the different positions to which said pointers are moved.

The inner or front wall 63 of the housing 46 is provided with three transversely spaced openings 64, 65, 66 which are disposed directly in front of portions of the peripheries 23 of the wheels 19, 20 and 21, respectively. Said front wall 63 is suitably marked to simulate a blackboard, as indicated at 67 in Figure 4 with the openings, 64, 65 and 66 disposed within the frame of the blackboard. However, the simulated blackboard 67 may be omitted, if desired.

Assuming that the toy or game apparatus 10 is to be used by two children in playing a spelling game, the children may take turns in actuating the apparatus 10. Actuation of the apparatus 10 is accomplished by manually engaging the lever arm 41 to rotate the shaft 28 clockwise as seen in Figure 3. During initial clockwise movement of the shaft 28 it will turn relatively to the wheel actuator 29 until the shoulder 38 of the clutch half 37 engages the shoulder 38 of the clutch half 33 whereupon the wheel actuator 29 will then rotate clockwise with the shaft 28 from its position of Figure 3 through an arc of more than 90° and so that the fingers 32 will pass between the shaft 28 and the toothed flanges 25. This movement of the actuating member 29 may cause the wheels 19, 20 and 21 to rotate slightly in counterclockwise directions as seen in Figure 3 against the resistance of the weak springs 50. Also, this clockwise rotation of the wheel actuator 29 will wind and tension the spring 43. Thereafter, when the lever arm 41 is released, the spring 43 will forcibly swing the wheel actuator 29 counterclockwise as seen in Figure 3 back to or beyond its position of Figure 3. In so moving, the tips of the fingers 32 will engage between teeth of the flanges 25 which are held properly arranged by the spring portions 52 engaging between certain of the flange teeth, to cause said fingers to momentarily mesh with the toothed flanges 25 for forcibly rotating the wheels 19, 20 and 21 clockwise against the resistance of the light springs 50 and the spring portions 52 will come to rest between teeth of the flanges 25 as the rotation of the wheels 19, 20 and 21 ceases, and said spaces between the teeth of the flanges 25 are so arranged that the tapes 26 of the three wheels will then be positioned with a letter of each tape located directly behind the opening of the window 64, 65 or 66 which is located in alignment with said tape. The letters of the tapes 26 are so arranged as to form three letter words in a majority of different combinations which can be assumed by the three wheel peripheries 23 due to the unique arrangement of the lettering on the three tapes 26 and which differs depending upon the wheel peripheries to which said tapes are applied.

As the wheel actuator 29 is thus forcibly swung counterclockwise as seen in Figure 3 by the tension of spring 43 the clutch half 33 which is in engagement with the clutch half 37 will cause said clutch half 37 to also rotate counterclockwise and carrying with it the shaft 28. The momentum of the shaft 28 and parts carried thereby, including the lever arm 41, may cause said parts and the shaft 28 to revolve as much as an additional complete revolution more than the actuator 29 and relatively thereto, in which case the shoulder 38 of the clutch half 37 will rotate away from the shoulder 38 of the clutch half 33 and thereafter the cam surfaces 39 of the clutch halves will engage one another to cause the clutch half 37 and collar 34 to slide on the shaft 28 and relatively to the pin 35 to allow the shoulders 38 to clear one another. Accordingly, the clutch half 37 will ordinarily return to a position as illustrated in Figure 5 with its shoulder 38 disposed ready to engage the shoulder 38 of the clutch half 33 when the shaft 28 is again turned by the lever arm 41 clockwise as seen in Figure 3. The opening 57 is provided so that in the event any play exists between the spacing sleeves 42 and 55 and the bearing member 14 and housing wall 53, that one end of the shaft 28 can slide into the opening 57 without said shaft end otherwise binding against the housing wall 56.

Various rules may be adopted for playing the game and if the first player after operating the machine as previously described has letters 27 of the three tapes 26 which are in alignment with the openings 64, 65 and 66 forming a word the player can announce the word formed and advance one of the pointers 60 into alignment with the next higher numeral 59 of the adjacent row of numerals for scoring the word thus formed. If desired, the rules may then provide that the player is given another turn to operate the machine 10 or the other player may then be entitled to his or her turn. Additionally, the rules may provide that a player will lose the score obtained where he or she fails to recognize that a word is spelled by the exposed letters or may be penalized for improperly declaring a word.

The strength of the springs 50 may be varied and the weight of the wheels 19, 20 and 21 may also be varied to cause said wheels to be rotated at different speeds and for different periods of time so that different combinations of letters will be exposed after each operation of the machine.

The majority of the parts constituting the game apparatus or toy 10 may be formed of various suitable materials including various inexpensive metals or plastic.

Numerous modifications and changes are contemplated and may readily be resorted to, without departing from the spirit or scope of the invention as hereinafter defined

I claim as my invention:

A toy or game apparatus comprising, the combination with a housing, a plurality of wheels journalled for rotation independently of one another within said housing each provided with an indicia bearing periphery, each of said wheels having an annular tooth portion fixed to one side thereof of smaller diameter than and laterally spaced from the wheel periphery, and means supported by the housing and yieldably engaging said toothed portions for retarding rotation of the wheels and for regulating the stopping positions of the wheels; of a shaft journalled in said housing, a handle fixed to an end of the shaft and disposed externally of the housing, a wheel actuator of one piece construction including bearing elements journalled on the shaft and finger elements extending radially from the shaft, means carried by the shaft for retaining the wheel actuator with the finger elements thereof in coplanar positions with the annular toothed portions, spring means connected to the wheel actuator and anchored to the housing for rotating the wheel actuator in a first direction about the axis of said shaft after the wheel actuator has been turned in the opposite second direction to load said spring means, a clutch including a first half forming an end portion of the wheel actuator and a second half slidably keyed to said shaft, a spring, forming a part of said retaining means, bearing against said second clutch half for urging said clutch half into engagement with the first half, said clutch halves having shoulders disposed to engage one another when the shaft is turned by the handle in said second direction for turning said wheel actuator with the shaft to load said spring means, said wheel actuator being revolved in said first direction by said spring means, when the handle is released, to cause the finger elements to momentarily mesh with said annular toothed portions in passing between said shaft and said annular toothed portions for rotating said wheels independently of one another, and said clutch halves having cam faces facing away from the shoulders thereof and engaging with one another to displace said second clutch half away from the first clutch half when the shaft is turned in said first direction relative to the wheel actuator, said cam faces cooperating with the spring to return the second clutch half to a position from which the clutch will be engaged to cause the wheel actuator to turn with the shaft in said second direction.

References Cited in the file of this patent

UNITED STATES PATENTS

| | | |
|---|---|---|
| 91,022 | Hoyt | June 8, 1869 |
| 371,815 | Bodey | Oct. 18, 1887 |
| 1,573,384 | Luske | Feb. 16, 1926 |
| 2,022,278 | Elliotte | Nov. 26, 1935 |
| 2,056,515 | Glaser | Oct. 6, 1936 |
| 2,190,845 | Nitzberg | Feb. 20, 1940 |
| 2,205,471 | Fagerholm | June 25, 1940 |
| 2,650,686 | Bigue | Sept. 1, 1953 |